United States Patent Office 3,178,445
Patented Apr. 13, 1965

3,178,445
NEW THIOPHENE DERIVATIVES
Erwin Maeder, Muenchenstein, Rudolf Anliker and Peter Liechti, Binningen, and Adolf Emil Siegrist, Basel, Switzerland, assignors to Ciba Limited, Basel, Switzerland, a company of Switzerland
No Drawing. Filed July 25, 1963, Ser. No. 297,664
Claims priority, application Switzerland, Aug. 27, 1962, 10,149/62
3 Claims. (Cl. 260—307)

The present invention provides valuable new thiophene derivatives corresponding to the general formula (1)

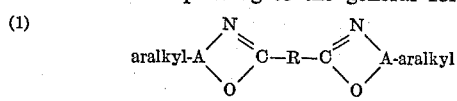

where each A represents a benzene nucleus in which two vicinal carbon atoms are members of the oxazole ring, and R represents a thiophene radical linked in positions 2 and 5 to the oxazole rings. Each benzene radical A contains an aralkyl radical, more especially a phenylalkyl radical; in addition, they may also contain a further substituent each, for example an alkyl group such as methyl.

From among the new thiophene derivatives of the above composition there may be mentioned, for example, those of the formula (2)

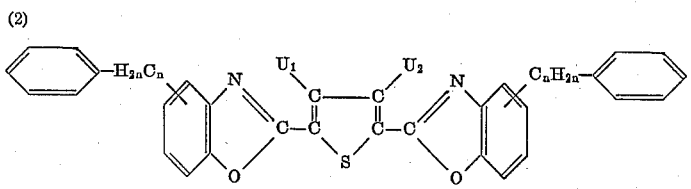

where $U_1$ and $U_2$ are identical or different and each represents a hydrogen atom or a methyl group, and $n=1$, 2 or 3; specially important among these thiophene derivatives of the Formula 2 are those which correspond to the formula (3)

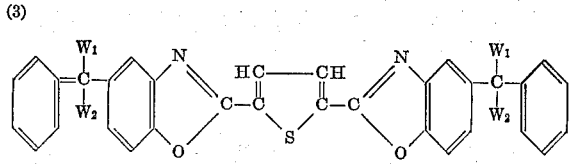

where $W_1$ and $W_2$ are identical or different and each represents a hydrogen atom or a methyl group.

The new thiophene derivatives corresponding to the above general Formula 1 are obtained when an ortho-hydroxy-amino compound of the formula (4)

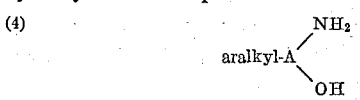

where A represents a benzene nucleus which may contain a further substituent, for example an alkyl group such as methyl, and the —OH group is in vicinal position to the —NH₂ group, is reacted at an elevated temperature and preferably in the presence of a catalyst in the molecular ratio of 2:1 with a dicarboxylic acid of the formula (5)    HOOC—R—COOH

where R stands for a thiophene radical linked in positions 2 and 5 to carboxyl groups, or with a functional derivative of such a dicarboxylic acid.

Particularly suitable starting materials are, for example, the ortho-hydroxyaminobenzenes of the formula (6)

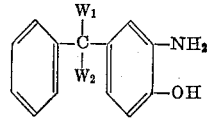

where $W_1$ and $W_2$ are identical or different and each represents a hydrogen atom or a methyl group—that is to say the compounds of the following formulae (7)

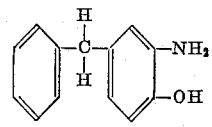

(8)

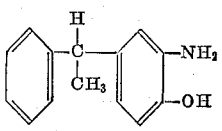

(9)

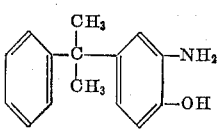

The compound used as further starting material is a dicarboxylic acid of the Formula 5, for example thiophene-2:5-dicarboxylic acid, 3:4 - dimethylthiophene-2:5 - dicarboxylic acid, 3:4-diphenylthiophene-2:5-dicarboxylic acid or monomethyl- or monophenyl-thiophene-2:5-dicarboxylic acid, or a functional derivative thereof, for example, a dinitrile or ester. Particularly suitable esters are those with lower aliphatic alcohols, for example the dimethyl and the diethyl ester.

The reaction of the selected components is carried out by heating to elevated temperatures, for example to 160 to 260° C., advantageously in an inert gas, for example in a current of nitrogen. The reaction is advantageously performed in the presence of a catalyst, for example boric acid, zinc chloride, para-toluenesulfonic acid, or polyphosphoric acids, including pyrophosphoric acid. When boric acid is used as catalyst, it is of advantage to use it in an amount of about 0.5%, calculated from the total weight of the reaction batch. It is also possible to use concomitantly high-boiling, polar organic solvents, for example dimethylformamide or aliphatic hydroxyl compounds which may be etherified, for example propyleneglycol, ethyleneglycol monoethyl ether or diethyleneglycol diethyl ether.

In the form of solutions or fine dispersions the new thiophene derivatives of the composition defined above display a more or less distinct fluorescence. They may be used as optical brighteners for a wide variety of organic materials. Good results are obtained, for example, in brightening acrylic resin lacquers, alkyd resin lacquers, cellulose ester lacquers, for example acetylcellulose lacquers, or nitrocellulose ester lacquers. The new thiophene derivatives are especially suitable for optically brightening synthetic fibers, for example fibers from cellulose esters such as cellulose propionate or acetylcellulose (cellulose diacetate or cellulose triacetate; acetate rayon), polyamides (for example nylon), polyesters or polyolefines such as polyethylene, and films, foils, tapes or shaped structures made from these materials or other materials such as polystyrene, polyvinyl chloride, polyvinylidene chloride, polyvinyl alcohol or polyvinyl esters of organic acids, for example polyvinyl acetate.

When synthetic fibers—which may be in the form of staple fibers or monofils in the crude state, or in the form of hanks or fabrics—are to be optically brightened according to this invention, this is advantageously carried out in an aqueous medium in which the compounds concerned are suspended; if desired, the treatment baths may further contain dispersing agents, for example soaps, polyglycol ethers of fatty alcohols, fatty amines or alkylphenols, cellulose sulfite waste liquor or condensation products of optionally alkylated naphthalenesulfonic acids with formaldehyde. It has proved particularly advantageous to work in a neutral, weakly alkaline or acid bath.

Likewise, it is of advantage to carry out the treatment at an elevated temperature ranging from about 50 to 100° C., for example at the boiling temperature of the bath or near it (at about 90° C.). The improvement according to the present invention may also be performed with solutions in organic solvents.

The new thiophene derivatives to be used in the present process may also be added to or incorporated with the materials before or during their shaping. Thus, they may be added to the moulding composition used for the manufacture of films, foils, tapes or shaped structures, or they may be dissolved or finely distributed in the spinning composition before the spinning operation. The new thiophene derivatives may also be added to the reaction mixture before or during the polycondensation yielding, for example, polyamides or polyesters, or they may be added to the polymerisation masses before or during the polymerisation of monomers, for example vinyl acetate or styrene.

The new thiophene derivatives are especially distinguished by their good fastness to sublimation and migration.

The amount of new thiophene derivative to be used according to the invention, calculated on the weight of the material to be optically brightened, may vary within wide limits. Even a very small amount, in certain cases for instance as little as 0.01%, may produce a distinct and durable effect. It is, however, also possible to use amounts of up to about 1%.

The new thiophene derivatives may be used for brightening in the following manner.

(a) In admixture with dyestuffs or pigments or as additive to dyebaths or printing, discharge or reserve pastes. Furthermore for after-treating dyeings, prints or discharge prints.

(b) In admixture with chemical bleaches or as additives to bleaching baths.

(c) In admixture with dressing agents, such as starch or synthetic dressing agents. The products of the invention may also be added, for example, to liquors used for producing crease-resistant finishes.

(d) In combination with detergents. The detergent and the brightener may be added separately to the washing liquors. It is also of advantage to use detergents containing a proportion of brightening agent. Suitable detergents are soaps, salts of sulfonate products, for example of sulfonated benzimidazoles substituted on the carbon atom 2 by higher alkyl radicals; also salts of monocarboxylic acid esters of 4-sulfo-phthalic acid with higher fatty alcohols; furthermore salts of fatty alcohol sulfonates, alkylarylsulfonic acids or condensation products of higher fatty acids with aliphatic hydroxysulfonic or aminosulfonic acids. Furthermore, there may be used ion-free detergents, for example polyglycol ethers derived from ethylene oxide and higher fatty alcohols, alkylphenols or fatty amines.

When the present process is combined with other treatment or improving operations, it is of advantage to carry out the combined treatment with the aid of a suitable preparation. These stable preparations contain compounds of the kind of the above Formula 1 as well as dispersing agents, detergents, dyestuffs, pigments or dressing agents.

Furthermore, the compounds of the above Formula 1 may be fixed on a finely dispersed carrier and used in this form.

Unless otherwise indicated, parts and percentages in the following examples are by weight.

*Example 1*

34.4 parts of thiophene-2:5-dicarboxylic acid, 91 parts of 1-hydroxy-2-amino-4-[2'-phenylpropyl-(2')] - benzene and 2 parts of boric acid are stirred under nitrogen in 200 parts by volume of diethylcarbitol.

Within 1 hour the reaction mixture is heated to 185 to 190° C., with water escaping and a clear, dark solution being formed. The batch is stirred for about 1 hour at this temperature, during which an intermediate product in the form of a yellow crystalline precipitate settles out. The temperature is then raised within 1 to 1½ hours to a level such that the bulk of the solvent distills off drop by drop. The initial suspension turns gradually into a clear, dark melt which is stirred on for about 30 minutes at 215 to 220° C.

100 parts by volume of dimethylformamide are then dropped into the melt, whereupon a dark solution forms. After cooling, the light-yellow, crystalline precipitate formed is suctioned off and rinsed with a small amount of dimethylformamide.

After drying, there are obtained about 74 parts of the compound of the formula (10)

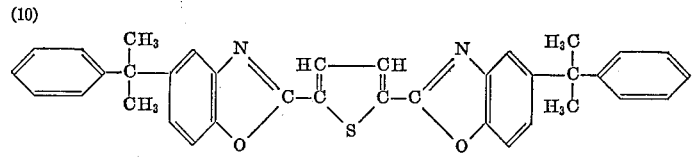

melting at 193–194° C. Recrystallization from dimethylformamide+alcohol furnishes small light-yellow needles melting at 194–194.5° C.

Analysis: $C_{36}H_{30}N_2O_2S$—

|  | C, percent | H, percent | N, percent |
|---|---|---|---|
| Calculated | 77.95 | 5.45 | 5.05 |
| Found | 77.65 | 5.44 | 5.00 |

When 1 - hydroxy - 2 - amino - 4 - [2' - phenylpropyl-(2')]-benzene is replaced by an equivalent amount of 1- hydroxy-2-amino-4-benzylbenzene and the condensation is carried out in an analogous manner, the compound of the formula

(11)
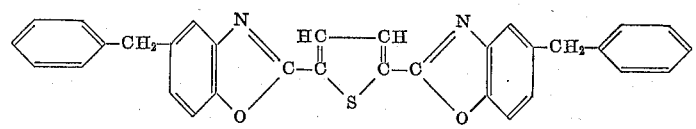

is obtained in similar purity and yield in the form of small light-yellow needles (from dimethylformamide) melting at 199.5–200° C.

Analysis: $C_{32}H_{22}N_2O_2S$—

|  | C, percent | H, percent | N, percent |
|---|---|---|---|
| Calculated | 77.08 | 4.45 | 5.62 |
| Found | 76.77 | 4.65 | 5.55 |

Example 2

A mixture of 6.6 parts of 3:4-dimethylthiophene-2:5-dicarboxylic acid, 13.3 parts of 1-hydroxy-2-amino-4-benzylbenzene and 0.7 part of boric acid is heated for 1½ hours on an oil bath under nitrogen at 220–225° C., during which water escapes and a homogeneous melt forms. The melt is allowed to cool, whereupon it solidifies; it is then dissolved in methylene chloride, filtered through a column of 250 parts of activated alumina, and the eluate is considerably concentrated. On addition of ethanol, there are obtained about 9.5 parts of the compound of the formula

(12)
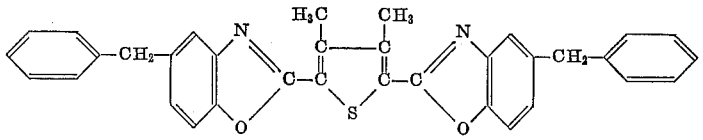

as a light-yellow crystalline precipitate melting at 215–216° C.

Recrystallization from dioxane+alcohol furnishes fine, light-yellow needles melting at 216–217° C.

Analysis: $C_{34}H_{26}N_2O_2S$—

|  | C, percent | H, percent | N, percent |
|---|---|---|---|
| Calculated | 77.54 | 4.98 | 5.32 |
| Found | 77.51 | 4.98 | 5.22 |

When 1-hydroxy-2-amino-4-benzylbenzene is replaced by an equivalent amount of 1-hydroxy-2-amino-4-[2'-phenylpropyl-(2')]-benzene and the condensation is carried out in an analogous manner, the compound of the formula

(13)
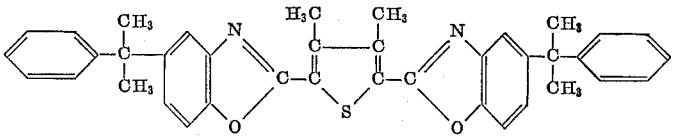

is obtained in similar purity and yield in the form of bundles of pale-yellow needles melting at 224–224.5° C. after recrystallisation from dioxane.

Analysis: $C_{38}H_{34}N_2O_2S$—

|  | C, percent | H, percent | N, percent |
|---|---|---|---|
| Calculated | 78.32 | 5.88 | 4.81 |
| Found | 78.19 | 5.85 | 4.92 |

Example 3

100 parts of a polyester granulate from polyterephthalic acid ethyleneglycol ester are intimately mixed with 0.05 part of the compound of the Formula 10 and fused at 285° C. with stirring. When the spinning composition thus formed is spun through usual spinnerets, conspicuously brightened polyester fibers are obtained.

Alternatively, the compound of the Formula 10 may be added to the reaction mixture before or during the polycondensation which gives rise to the polyester.

Similar effects are obtained with the compound of the Formula 11.

Example 4

10,000 parts of a polyamide in chip form, prepared in known manner from hexamethylenediamine adipate, are mixed with 30 parts of titanium dioxide (rutile modification) and 10 parts of the compound of the Formula 10 in a tumbling barrel for 12 hours. The chips treated in this manner are then melted in a boiler heated by means of oil vapour or diphenyl vapour at 300 to 310° C. (from which the atmospheric oxygen has first been displaced with super-heated steam), and the melt is stirred for ½ hour and then expressed through a spinneret under a nitrogen pressure of 5 atmospheres (gauge). The filament thus formed is allowed to cool and then wound on to a spinning bobbin. The filament obtained in this manner has an excellent brigthening effect which is fast to heat-setting and has good fastness properties to washing and light.

Example 5

An intimate mixture of 100 parts of polyvinyl chloride, 54 parts of dioctyl phthalate and 0.1 part of the compound of the Formula 10 or 11 is converted into a film by being rolled for about 6 minutes on a calender heated at 150 to 160° C.

The polyvinyl chloride film obtained in this manner has a substantially higher white content than a film manufactured in the absence of the thiophene compound.

What is claimed is:
1. A compound of the formula

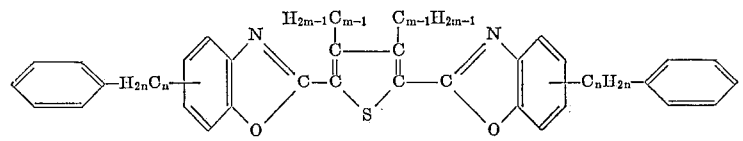

in which $m$ represents a whole positive number of at most 2 and $n$ stands for a whole positive number of at most 3.

2. A compound of the formula

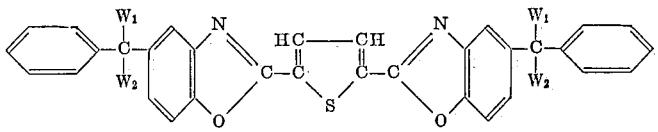

in which $W_1$ and $W_2$ each represents a member selected from the group consisting of hydrogen and methyl.

3. The compound of the formula

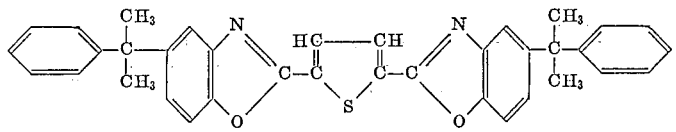

No references cited.

IRVING MARCUS, *Primary Examiner.*
NICHOLAS S. RIZZO, *Examiner.*